Aug. 27, 1957  R. J. BUSH  2,804,353
SAFETY INTERLOCK APPARATUS FOR ANTI-WHEEL SLIDE EQUIPMENT
Filed July 21, 1953
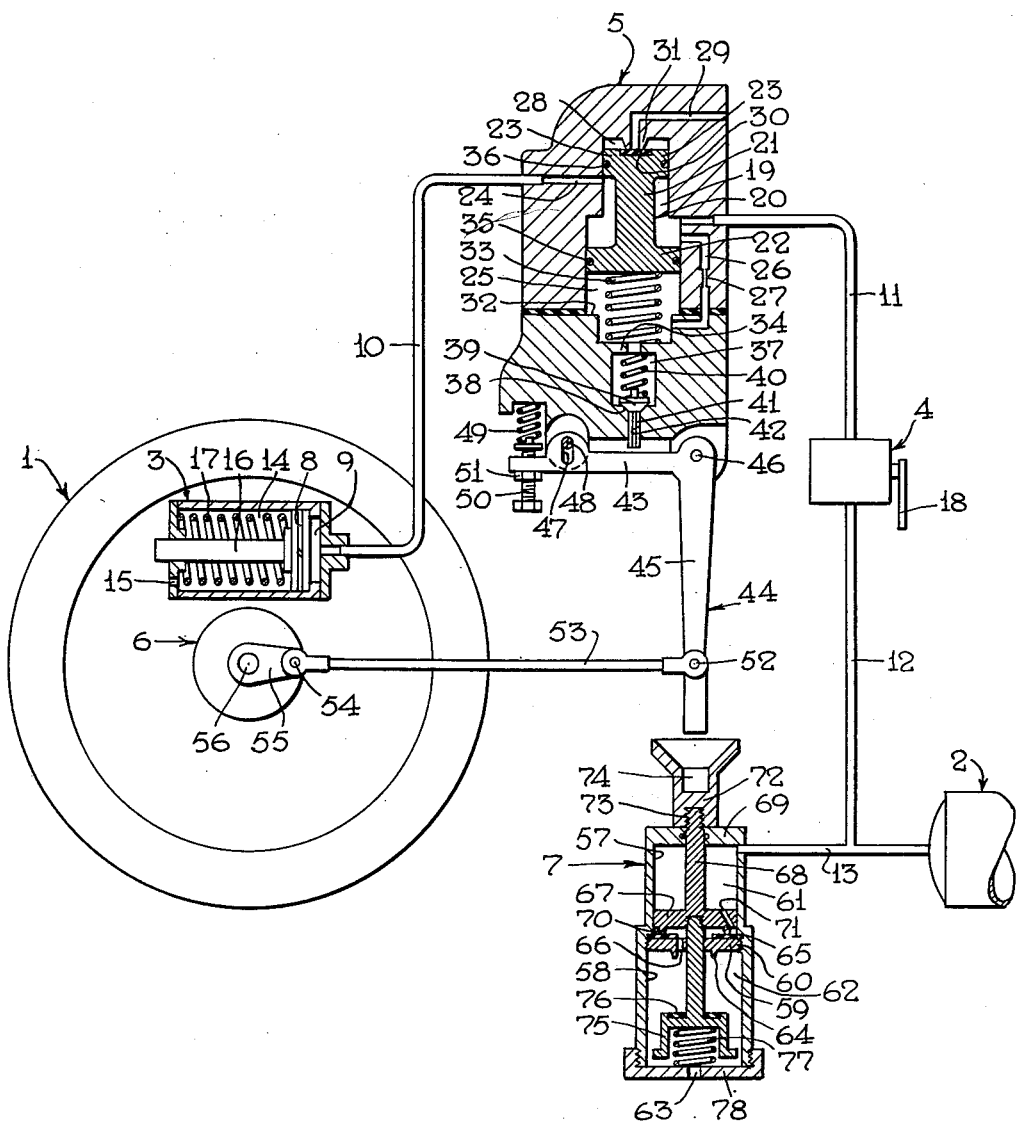
INVENTOR.
Rankin J. Bush
BY
Adelbert G. Steinmiller
ATTORNEY United States Patent Office 2,804,353
Patented Aug. 27, 1957

2,804,353

SAFETY INTERLOCK APPARATUS FOR ANTI-WHEEL SLIDE EQUIPMENT

Rankin J. Bush, Greensburg, Pa., assignor to Westinghouse Air Brake Company, Wilmerding, Pa., a corporation of Pennsylvania Application July 21, 1953, Serial No. 369,466

5 Claims. (Cl. 303—21)

This invention relates to vehicle brake control apparatus of the fluid pressure operable type adapted to automatically prevent locking and sliding of a vehicle wheel, and, more particularly, to such a brake control apparatus embodying means for preventing depletion of fluid pressure in the fluid pressure supply reservoir below a point at which the fluid pressure would be ineffective to safely operate the wheel brakes.

In fluid pressure operable brake control apparatus of the type employed on airplanes, anti-wheel-slide control devices responsive to a slipping condition of a wheel have been provided for automatically releasing the fluid pressure from and reapplying the fluid pressure to the brake application devices associated with the wheels to correspondingly release and reapply the braking force on the wheels, in repeated cycles, during the stopping distance of the airplane, to thereby prevent locking of the wheels. As herein used, the term "slipping condition" refers to the condition existing during the short interval, of the order of one or two seconds, in which the wheel decelerates at an excessively rapid rate toward a locked condition as a result of application of a braking force exceeding the permissible limit of adhesion of the wheel tread to the ground or road surface. As distinguished from the term slipping condition, the term "sliding condition," as used herein, refers to the dragging of a wheel in a locked condition on the runway or ground.

It has been demonstrated that, with use of the type of brake control apparatus above described in connection particularly with airplanes, the fluid pressure in the fluid pressure supply reservoir may be depleted so rapidly that the compressor supplying fluid pressure to said reservoir cannot maintain adequate pressure therein to insure an adequate degree of braking effort on the wheels. This rapid depletion of fluid pressure in the fluid pressure supply reservoir on airplanes is usually due to the excessive frequency and number of cycles of release and reapplication of the brakes necessitated by undesirable runway conditions such as an uneven, icy or wet condition of the surface and also to the fact that the volume of the reservoir, while adequate for all normal braking operations being limited by space limitation on the airplane and by weight, may be inadequate for an abnormal condition such as just mentioned.

Accordingly, the principal object of my invention is to provide a brake control apparatus of the type described having means for cutting out the wheel-slip-responsive control device, to thereby prevent further automatic release of the braking pressure and consequent further reduction of reservoir pressure, before the reservoir pressure becomes reduced to a degree where it would not provide sufficient braking pressure to insure safe stopping of the airplane.

Other objects and advantages of my invention will appear in the following more detailed description thereof when read in conjunction with the accompanying drawing.

In the accompanying drawing, the single figure is a diagrammatic view, partly in section and partly in outline, of a brake control apparatus embodying the invention.

Description

For purposes of illustration, the invention will hereinafter be described in connection with airplanes, but it should be understood that it is not intended to be so limited, for the invention is equally applicable to other wheel vehicles employing fluid pressure operable brake apparatus.

As shown in the drawing, the reference numeral 1 designates a vehicle wheel adapted to be braked. The fluid pressure operable brake control apparatus for applying braking force to and releasing such force from the wheel 1 comprises a fluid pressure supply reservoir 2, which is adapted to be charged by a compressor (not shown) with fluid under pressure sufficient to effectively and safely operate the brake apparatus normally, a brake application device 3, a manually operable brake control valve device 4, a release valve device 5, a wheel-slip responsive control device 6, and a fluid pressure responsive locking device 7.

The brake application device 3 is adapted to be arranged in conventional manner for applying braking force to the wheel 1 and, for purposes of illustration, comprises a casing containing a piston 8 at one side of which there is a pressure chamber 9 adapted to be connected through a conduit means comprising pipes 10, 11, 12 and 13 to the reservoir 2 and at the opposite side of which is a non-pressure chamber 14 vented to atmosphere by way of a port 15. The piston 8 has a piston rod 16 extending through chamber 14 and the cylinder head to the exterior of the casing and adapted for actuating brake shoes or brake elements (not shown) to exert a braking effect on the wheel 1 by suitable means not shown. The piston 8 and the piston rod 16 are adapted to be moved in the direction of the left hand, as viewed in the drawing, by fluid pressure in chamber 9 to a brake-applying position in which a braking force on wheel 1 is effected. A spring 17 provided in chamber 14 acts on piston 8 to move said piston and the piston rod 16 back to a normal position, in which they are shown in the drawing and in which the braking force on the wheel 1 is released, upon relief of fluid pressure in chamber 9.

The control valve device 4, which is interposed between pipes 11 and 12, is the usual self-lapping type control valve device adapted to be manually operated by a handle 18 from a brake release position, in which pipe 11 is disconnected from pipe 12 and open to atmosphere, to any one of a plurality of application positions, in which said pipes are connected, to supply fluid from reservoir 2 to said pipe 11 at a pressure proportional to the extent of such movement of said handle.

The release valve device 5 is interposed between pipes 10 and 11 for controlling communication therebetween and thereby between the brake application device 3 and the reservoir 2 by way of said pipes, the control valve device 4 and pipes 12, 13. The release valve device 5 comprises a casing having a chamber 19 in which is disposed a spool-shaped valve member 20 provided with a connecting member 21 having formed integrally therewith at one end a piston 22 and at the opposite end a valve 23. In one position of valve 23 chamber 19 may be open by way of a passageway 24 in the casing and the pipe 10 to chamber 9 of the brake application device 3. At the side of piston 22 opposite chamber 19 is a pressure chamber 25 connected to chamber 19 through a passageway 26 provided with a choke 27, while at the side of valve 23 opposite chamber 19 is a chamber 28 which may be vented to atmosphere through a passageway 29, Valve 23 is provided on the side adjacent chamber 28 with a sealing gasket 30 adapted for seating on an annular seat rib 31 surrounding the opening of passageway 29 into chamber 28 when the valve member 20 is in a normal position, in which it is shown in the drawing and in which communication between pipes 10 and 11 is open through chamber 19 and passageway 24. The valve member 20 is slidably operable to a brake release position limited by abutment of the piston 22 with a shoulder 32 formed in chamber 25 and in which the valve 23 moves past the opening of passageway 24 thereby closing off communication between pipes 10 and 11 through chamber 19 and opening chamber 9 of the brake cylinder device 3 to atmosphere by way of pipe 10, passageway 24, chamber 28 and passageway 29. A spring 33 disposed in chamber 25 and having one end bearing against piston 22 and the opposite end bearing against a separating wall 34 is adapted for urging the valve member 20 toward its normal position. Piston 22 and valve 23 are provided with sealing O-rings 35, 36, respectively, to prevent leakage of fluid under pressure past said piston and said valve.

The casing of release valve device 5 has at the side of separating wall 34 opposite chamber 25 a recess 37 opening into said chamber and having at its base an annular valve seat 38 on which a valve 39 is adapted to be normally seated. The valve 39, which is urged toward its normal position, in which it is shown in the drawing, by a spring 40 disposed in recess 37 and acting on said valve, has associated therewith a fluted valve stem 41 slidably operable in a bore 42 leading to the exterior of the casing to permit release of fluid pressure from chamber 25 through recess 37 and past said valve stem when said valve is in an unseated position.

The valve stem 41 extends through the bore 42 to the exterior of the casing of the release valve device 5 and is arranged to make abutting contact intermediate the ends of one arm 43 of an operating bell-crank lever 44 when said operating lever is in a certain position which will hereinafter be described. A second arm 45 of the operating lever 44 depends from one end of arm 43 at right angles thereto, said operating lever being pivotally mounted at the junction of said arms by means of a pin 46 secured in the casing of the release valve device 5. The arm 43 has at the end opposite its junction with arm 44 a slot 47 into which extends a pin 48, which is secured in the casing of release valve device 5, for limiting the pivotal motion of the lever 44 about the pin 46. A spring 49 is compressed between the casing of release valve device 5 and the end of arm 43 adjacent the slot 47 for biasing the lever 44 toward a normal position, in which it is shown in the drawing and in which said arm disengages valves stem 41 to permit the valve 39 to be seated by spring 40. A screw 50 is adjustably mounted in the end of arm 43 adjacent slot 47 for adjusting the compression of spring 49 and is secured in an adjusted position by a lock nut 51.

The arm 45 of the operating lever 44 is pivotally connected by means of a pin 52, adjacent the end opposite its junction with arm 43, to one end of a link rod 53, the other end of said link rod being pivotally connected by means of a pin 54 to one end of a rocker arm 55. The other end of the rocker arm 55 is rigidly connected to an operating shaft 56 of the control device 6.

The control device 6, which is shown in outline in the drawing, may be of any suitable type but preferably is a rotary type, such as that disclosed, for example, in U. S. Patent No. 2,573,387, issued to me on October 30, 1951, including a housing adapted to be coaxially and removably attached to the wheel 1 for rotation therewith. While not deemed essential to an understanding of the invention and, therefore, not shown in the drawing, the housing of the control device 6 contains a relatively rotatable inertia mass connected through clutch means and a cluster of planetary gears to the operating shaft 56 in such a manner that when rotation of said inertia mass is in synchronization with the rotation of the wheel 1, or what may be called a normal rotating position occupied when said wheel is not slipping on the runway, no relative effect is produced on said operating shaft, and the operating lever 44 will remain in its normal position. But when the wheel 1 is accelerating to ground speed immediately following touchdown or when said wheel is decelerating in response to a slip on the runway, the inertia mass will either lag behind or overrun, respectively, said wheel and operate the operating shaft 56 to in turn operate the lever 44 through the link rod 53 to a release position which will hereinafter be described.

The locking device 7, for purposes of illustration, may comprise a casing which is fixed with respect to that of the release device 5, and having at its upper end, as viewed in the drawing, a bore 57 and at the opposite end a bore 58 axially aligned with and of slightly greater diameter than bore 57. A valve member 59 is fixedly mounted in the casing at the juncture of bore 58 with bore 57 by means of screw-threads 60 to define at the side of said valve member adjacent bore 57 a chamber 61, open by way of pipe 13 to reservoir 2, and at the opposite side a chamber 62 which is vented to atmosphere by a port 63. The valve member 59 is provided, at the side adjacent chamber 62, with an annular seat rib 64 and at the opposite side with an annular sealing gasket 65. The valve member 59 is further provided with a port 66 opening to both sides of said valve member and within the seat rib 64 on the side adjacent chamber 62.

A piston 67 is slidably operable in the bore 57, said piston having concentrically associated therewith a piston rod 68 extending from both sides of said piston, with the upper portion of said piston rod, as viewed in the drawing, extending through chamber 61 and an end-wall 69 to the exterior of the casing and the lower portion extending through the valve member 59 into chamber 62. The piston 67 is provided, at the side adjacent valve member 59, with an annular seat rib 70 greater in diameter than seat rib 64 and adapted for making sealing engagement with the sealing gasket 65 when said piston is in a normal position, in which it is shown in the drawing. The piston 67 is also provided with a port 71 opening to both sides of said piston and outside the seat rib 70 on the side opposite chamber 61.

A socket member 72 is attached by means of screw-threads 73 to the end of the piston rod 67 projecting beyond the endwall 69 outside the casing. The socket member 72 has a recess 74 adapted for engaging the end of arm 45 adjacent the pin 52 of the release valve device operating lever 44 when the piston 67, according to the invention, is operated out of its normal position, in response to a reduction of fluid pressure in chamber 61 to a minimum operating value, to a locking position in which the operating lever 44 of the release valve device 5 is locked in its normal position by said engagement.

The opposite end of the piston rod 68 carries a valve member 75 provided with an annular sealing gasket 76 adapted for making sealing engagement with the seat rib 64 when the piston 67 is in its locking position. A spring 77, having one end bearing against the valve member 75 and the other end bearing against a closure cap 78 which closes the lower end of chamber 62, is adapted for unseating the piston 67 from the sealing gasket 65 in response to a reduction of fluid pressure in chamber 61 to the predetermined minimum.

While, for purposes of illustrating the invention, only one landing wheel assemblage and a brake control apparatus therefor are shown in the drawing, it should be understood that each landing wheel of an airplane or other vehicle is intended to be equipped with a like brake control apparatus embodying the invention and to be controlled in the manner following as pertains to the one landing wheel shown in the drawing.

Operation

In operation, let it be assumed that the fluid pressure in the reservoir 2 is at a maximum operating value within a range sufficient to effectively and safely operate the brake apparatus, that, consequently, chamber 61 of the locking device 7 is charged, by way of pipe 13, with fluid under such pressure, and that the several devices comprising the brake control apparatus are in their respective normal positions, in which they are shown in the drawing.

Let it further be assumed that the landing wheels of the airplane, in landing, have just made contact with the runway surface. The pilot, or operator, of the airplane, upon touchdown of the wheel 1 on the runway surface, or shortly thereafter, may operate the brake control valve device 4 to a desired brake application position, thereby opening communication between pipes 12 and 11. With the valve device 4 open, fluid under pressure will flow through pipes 13, 12 and 11 to chamber 19 and thence by way of passageway 26, to chamber 25 of the release valve device 5. The choke 27 in the passageway 26 restricts flow of fluid under pressure through said passageway, thereby delaying build-up of fluid pressure in chamber 25 with respect to that in chamber 19. As a result of such restriction of flow, the fluid pressure differential thus active on piston 22 will be sufficient to overcome the opposing force of spring 33 and cause movement of valve member 20 toward its brake release position.

Immediately upon touchdown the wheel 1 will commence to accelerate and overrun the rotary inertia mass (not shown) contained in the control device 6 and angular movement of the operating shaft 56 and the rocker arm 55 out of normal position, as in a clockwise direction, as viewed in the drawing, is correspondingly effected. This movement of arm 55, acting through link rod 53, will rock the operating lever 44 of the release valve device 5 about the pin 46 in a clockwise direction, as viewed in the drawing, to its release position against the opposing force of spring 49. With the operation of lever 44 to its release position, the arm 43 will engage valve stem 41 to move said stem upwardly and unseat the valve 39 to permit the fluid pressure in chamber 25 of release valve device 5 to vent to atmosphere through the recess 37, past valve 39 and the fluted stem 41. With chamber 25 vented to atmosphere and with the choke 27 restricting flow of fluid pressure from chamber 19 to chamber 25, the fluid pressure in the said chamber 19 will overcome the opposing force of spring 33 and move valve member 20 to its brake release position.

The inertia device 6 will respond to acceleration of the wheel 1 to open chamber 25 of the release valve device 5 to atmosphere and thereby cause movement of the valve member 20 to its brake release position, as just described, almost instantaneously at the start of acceleration of said wheel upon touchdown.

With the valve member 20 to its brake release position, communication between chamber 19 and pipe 10 is closed and the brake application piston 8 is relieved of any fluid pressure, which may have been acting thereon in chamber 9, by venting chamber 9 to atmosphere through pipe 10, passageway 24, chamber 28 and passageway 29. In the manner just described, an application of braking force to the wheel 1 will be automatically prevented upon touchdown of said wheel, thereby preventing a possible locking and sliding of said wheel before it can attain a rotational speed equivalent to the ground speed of the airplane or vehicle.

When, after touchdown, the wheel 1 has become accelerated to substantially ground speed, the inertia mass in the control device 6 will obtain a corresponding speed and will permit spring 49 to bias the lever 44 to its normal position out of contact with valve stem 41, thereby permitting valve 39 to be reseated by the spring 40 to prevent further venting of chamber 25 to atmosphere. With chamber 25 closed to atmosphere, the fluid pressure in chambers 19 and 25 will equalize through passageway 26, whereupon the spring 33 will bias valve member 20 to its normal position to establish communication between pipes 11 and 10, through chamber 19 and passageway 24, thereby permitting chamber 9 of the brake application device 3 to be supplied with fluid from reservoir 2 at a pressure controlled by the brake valve device 4. Fluid pressure in chamber 9 of the brake application device 3 will actuate the piston 8 against the opposing force of the spring 17 to cause a braking effect to be exerted on the wheel 1.

With a braking effect being applied to the wheel 1, let it now be assumed that said wheel runs into a slippery or uneven condition of the runway surface so that the degree of the brake application is such as to exceed the traction or adhesion between said wheel and the runway surface. As a result, the wheel 1 begins to slip and incidentally decelerate so rapidly relative to the rotary inertia mass in the control device 6, that the operating shaft 56 of said control device and the rocker arm 55 will be turned in a counterclockwise direction, as viewed in the drawing, to act through link rod 53 to operate lever 44 of the release valve device 5 to its release position, and, in the manner hereinbefore described, to vent fluid pressure from chamber 25 to atmosphere to permit valve member 20 to be moved to its brake release position in which chamber 9 of the brake application device 3 will also be vented to atmosphere to release the braking effect on the wheel 1, as above described.

With the braking effect on the wheel 1 released in response to slipping of said wheel, in the manner just described, said wheel will accelerate back to the ground speed of the airplane, while the inertia mass, which, during the time that said wheel was decelerating as a result of the slipping, was overrunning said wheel, will, during the time that said wheel is accelerating back to ground speed, momentarily lag behind so that the rocker arm 55, in returning to its normal position, in a clockwise direction, will momentarily move past its normal position until said inertia mass is brought up to synchronized speed with said wheel by the clutch means, then will return to its normal position. With the wheel and the inertia mass of the control device 6 rotating in synchronization, said control device will effect operation of the release valve device to its normal position in which fluid under pressure will be again supplied to chamber 9 of the brake application device 3 to cause reapplication of braking effect on the wheel 1. If the wheel 1 again starts to slip before the airplane or vehicle is brought to a stop, the braking effect thereon will again be released and, upon cessation of wheel slip, reapplied in the same manner as above described, until eventually the vehicle comes to a stop, it being noted that actual locking and sliding of the wheel or wheels is positively prevented during stopping of the vehicle.

It is possible, however, that the condition of the runway may be such as to necessitate operation of the brake control apparatus through a series of braking and releasing cycles with such frequency and of such a number that the fluid pressure in the reservoir 2 is reduced too rapidly to permit the compressor to maintain sufficient fluid pressure in said reservoir to insure effective operation of the brakes and safe stopping of the plane. Therefore, according to the invention, the locking device 7 has been provided to prevent such a possible failure of brakes.

As long as the fluid pressure in the reservoir 2 and, consequently, in chamber 61 of the locking device 7 is at a value above a certain minimum value within the range at which the brake apparatus will effectively and safely operate, the piston 67 will be maintained in its normal position in which the socket member 72 is disengaged from and shifted out of line of movement of the adjacent end of the lever 44 of the release valve device 5, thereby permitting the release valve device 5 to be controlled entirely by the control device 6. Let it now be assumed, however, that for reasons above noted, the fluid pressure in reservoir 2 and, consequently, in chamber 61 of the locking device 7 has been reduced to a minimum value within the effective range and below which it would not be deemed safe for automatic operation of the brake apparatus. At that point the force of spring 77 will be effective to unseat seat rib 70 from the sealing gasket 65. Unseating of the seat rib 70 will permit equalization of fluid pressure, through the port 71, on equal areas on both sides of the piston 67 to permit spring 77 to move said piston promptly to its locking position in which the adjacent end of lever 44 will be engaged in the recess 74 of the socket member 72 and the sealing gasket 76 will make sealing engagement with the seat rib 64. With lever 44 of the release valve device 5 engaged by the socket member 72 of the locking device 7, said lever will be locked in its normal position and thereby rendered inoperative by the control device 6 and ineffective for effecting venting of chamber 25 of the device 5. The valve member 29 of the release valve device 5 will, therefore, be maintained in its normal position by the spring 33. The pilot, or operator, of the airplane, or vehicle, may, at that point, control the operation of the brakes through the manually operable brake control device 4. This manual control of the brakes will afford the compressor time to restore the fluid pressure in the reservoir 2 until said pressure reaches the maximum value.

As previously noted, the diameter of the seat rib 64 in the locking device 7 is less than the diameter of the seat rib 70. Therefore, the effective pressure area opposing the force of spring 77 will be less when the piston 67 is in its locking position than when said piston is in its normal position. This being the case, in order to overcome the opposing force of spring 77 when the piston 67 is in its locking position, the fluid pressure in chamber 61, which will also be acting on the area of valve member 75 enclosed by the seat rib 64 by virtue of the ports 71 and 66, will have to be increased to a certain value above the minimum value in order to return the piston 67 to its normal position.

We may now assume that the fluid pressure in the reservoir 2 has been restored by the compressor to the certain value just mentioned, which will be determined by the difference in the effective pressure areas enclosed by the respective seat ribs 64 and 70, at which value of fluid pressure the force of fluid pressure exerted on the area of valve member 75 enclosed by the seat rib 64, when the piston 67 is in its locking position, will overcome the opposing force of spring 77 to unseat the valve member 75 from the seat rib 64 and promptly move said piston to its normal position, thereby disengaging the socket member 72 from the lever 44 of the release valve device 5. With the unlocking or releasing of lever 44, braking effect and release thereof on the wheel 1 will again be automatically controlled by the control device 6, as above described.

*Summary*

From the above description of my invention it should now be seen that I have provided, for a fluid pressure operable brake control apparatus of the type which automatically effects release and reapplication of braking effect on a wheel in response to slipping of said wheel to prevent locking or sliding of said wheel on a runway surface, automatic means for preventing depletion of fluid pressure available for brake application below a minimum operating value at which the fluid pressure would be insufficient for effective or safe brake application.

Having now described my invention, what I claim as new and desire to secure by Letters Patent, is:

1. A brake control apparatus comprising, in combination, a brake application device responsive to fluid pressure for effecting a brake application to a vehicle wheel and to relief of such pressure for releasing said brake application, a source of fluid under pressure, the pressure of which is adapted to be maintained within a certain operating range sufficient for effecting an effective and safe brake application to said wheel, conduit means by which said brake application device may be connected to said source of fluid under pressure, manually operable valve means interposed in said conduit means having a release position in which communication through said conduit means is closed and said brake application device is relieved of fluid under pressure and having an application position for opening said communication to permit flow of fluid under pressure from said source to said application device, a release valve device interposed in said conduit means between said brake application device and said valve means for automatically controlling communication through said conduit means when said valve means is in said application position, said release valve device having a normal position in which said communication is open and operable to a brake release position in which said communication is closed and said brake application device is relieved of fluid pressure, an operating lever associated with said release valve device and mechanically operable out of a normal position, in which said release valve device is in its normal position, to a release position in which said release valve device is operated to its release position, a control device connected by linkage to said operating lever and arranged with said vehicle wheel to respond to a slipping condition of said wheel for operating out of a normal position for moving said lever through said linkage to its release position and responsive to cessation of said slipping condition for operating back to its normal position for restoring said lever to its normal position, and a locking device directly connected through conduit means to said source of fluid under pressure, said locking device being responsive to a reduction of fluid pressure at said source to a minimum operating value to operate to a locking position in which said lever is thereby engaged and locked in its normal position and responsive to restoration of fluid pressure at said source to a certain value above said minimum value to operate to a normal position in which said lever is disengaged by said locking device.

2. A brake control apparatus comprising, in combination, a brake application device responsive to fluid pressure for effecting a brake application to a vehicle wheel and to relief of such pressure for releasing said brake application, a source of fluid under pressure, the pressure of which is adapted to be maintained within a certain operating range sufficient for effecting an effective and safe brake application to said wheel, conduit means by which said brake application device may be connected with said source of fluid under pressure, valve means interposed in said conduit means for controlling the pressure of fluid flowing therethrough, said valve means being manually and selectively operable from a release position in which communication through said conduit means is closed to a brake application position in which said communication is open, a release valve device interposed in said conduit means between said valve means and said brake application device for automatically controlling said communication through said conduit means independently of said valve means when the latter is in a brake application position, a valve member included in said release valve device and having a pressure chamber at one side thereof open to said conduit means, said valve member being responsive to fluid pressure in said chamber to move to a normal position in which said communication through said conduit means is open and responsive to relief of fluid pressure in said chamber to move to a brake release position in which said communication is closed and said brake application device is relieved of fluid pressure, a valve for controlling a vent in said chamber, an operating lever for operating said valve and having a normal position in which said valve is closed and operable to a release position in which said valve is opened and said chamber is vented to atmosphere, a control device connected by linkage to said operating lever and adapted to be mounted on said vehicle wheel to respond to a slipping condition thereof to operate said lever through said linkage to its release position and to respond to cessation of said slipping condition to permit said lever to be operated to its normal position, and a locking device connected through conduit means to said source of fluid under pressure and adapted, in response to a reduction of the fluid pressure at said source to a minimum operating value, to move to a locking position in which said operating lever is thereby engaged and locked in its normal position and, in response to restoration of the fluid pressure at said source to a certain value above said minimum value, to move to a normal position in which said operating lever is disengaged by said locking device.

3. A brake control apparatus comprising, in combination, brake means responsive to fluid pressure for effecting a brake application on a vehicle wheel and to relief of such pressure for effecting a brake release, a source of fluid under pressure, the pressure of which is adapted to be maintained within a certain operating range sufficient for effecting an effective and safe brake application to said wheel, conduit means connecting said source to said brake means, a release valve device interposed in said conduit means and responsive to fluid pressure to operate to a normal position in which fluid under pressure is adapted to be supplied from said source to said brake means and responsive to relief of such pressure to operate to a brake release position in which said brake means is relieved of fluid pressure, an operating lever for operating said release valve device, said operating lever having a normal position and operable to a release position in which positions operation of said release valve device to its normal position and brake release position, respectively, is effected, a control device connected through linkage to said operating lever, said control device being responsive to a slipping of said wheel and to cessation of said slipping condition to effect operation of said lever through said linkage to its release position and normal position, respectively, and a locking device directly connected to said source of fluid under pressure and arranged in fixed relation with respect to said release valve device, said locking device comprising a casing having reciprocally disposed therein a piston adapted, in response to fluid pressure from said source at a certain value above a minimum operating value, to move to a normal position in which a certain pressure area on one side of said piston is subjected to fluid pressure at said certain value and a lesser pressure area at the opposite side of said piston is subjected to the combined forces of said fluid pressure at said certain value and a spring and, in response to the force of said spring upon reduction of fluid pressure from said source to said minimum value, as determined by the difference of said pressure areas, to move to a locking position in which equal pressure areas on both sides of said piston are subjected to fluid pressure from said source and said operating lever is engaged by a socket member associated with a piston rod on said piston to render said operating lever of said release valve device inoperative by said control device until the fluid pressure in said source has been restored to said certain value.

4. A brake control apparatus comprising, in combination, a brake application device operable in response to fluid pressure and to relief of such pressure for effecting a brake application and release of said brake application, respectively, on a vehicle wheel, a source of fluid under pressure, conduit means between said source and said brake application device, a release valve device interposed in said conduit means and operable in response to fluid pressure to move to a normal position in which it effects supply of fluid under pressure from said source to said brake application device and operable in response to relief of fluid pressure to move to a brake release position in which it relieves fluid pressure from said brake application device, an operating lever associated with said release valve device for operating same, a control device associated with said vehicle wheel and responsive to a slipping thereof for operating said lever to one position in which said release valve device is relieved of fluid pressure and responsive to cessation of said slipping for restoring said lever to a normal position in which fluid pressure is restored to said release valve device, and a locking device having a member adapted for engaging said operating lever, said locking device being operatively responsive to a reduction of the pressure of fluid at said source below a certain value to move said member to a position in which said operating lever is engaged and locked in its said normal position to thereby render said lever inoperable by said control device and responsive to restoration of pressure of fluid at said source above a certain value to move said member out of engagement with said operating lever.

5. In a brake control apparatus having a brake applying device responsive to fluid pressure and relief of such pressure for effecting application and release, respectively, of a braking force on a vehicle wheel, the combination comprising manually operable means having an application position and a release position for controlling supply of fluid pressure from a source of fluid under pressure to, and release of such pressure from, said brake applying means, respectively, automatically operable means, linkage having one end connected to said automatically operable means, control means connected to the other end of said linkage responsive to a slipping of said vehicle wheel and to cessation of said slipping for actuating said linkage whereby said automatically operable means is operated to a release position and an application position, respectively, in which positions fluid pressure is released from and supplied to, respectively, said brake applying means independently of said manually operable means when the latter is in its application position, and means operable out of a normal position, in response to a reduction of the pressure of fluid at said source below a certain value, to a locking position in which said linkage is engaged and locked for arresting said automatically operable means in its application position until the pressure of fluid at said source is restored to a certain value above the first mentioned value.

References Cited in the file of this patent

UNITED STATES PATENTS

| | | |
|---|---|---|
| 1,297,517 | Turner | Mar. 18, 1919 |
| 2,088,184 | White | July 27, 1937 |
| 2,198,029 | Farmer | Apr. 23, 1940 |
| 2,279,433 | Logan | Apr. 14, 1942 |